United States Patent [19]
Trompower

[11] Patent Number: 5,924,040
[45] Date of Patent: Jul. 13, 1999

[54] WIRELESS COMMUNICATION SYSTEM HAVING BASE STATION WITH ADJUSTABLE POWER TRANSCEIVER FOR LOCATING MOBILE DEVICES

[75] Inventor: Michael L. Trompower, Navarre, Ohio

[73] Assignee: Telxon Corporation, Akron, Ohio

[21] Appl. No.: 08/752,906

[22] Filed: Nov. 20, 1996

[51] Int. Cl.$^6$ ............................... H04Q 7/20; H04Q 7/30
[52] U.S. Cl. ............................................ 455/456; 455/562
[58] Field of Search ................................... 455/422, 456, 455/458, 561, 562; 342/357, 457

[56] References Cited

U.S. PATENT DOCUMENTS

| 5,241,690 | 8/1993 | Larsson et al. | 455/70 |
|---|---|---|---|
| 5,293,642 | 3/1994 | Lo . | |
| 5,488,737 | 1/1996 | Harbin et al. | 455/562 |
| 5,508,707 | 4/1996 | LeBlanc et al. | 455/456 |
| 5,519,760 | 5/1996 | Borkowski et al. . | |
| 5,602,555 | 2/1997 | Searle et al. | 455/562 |
| 5,603,089 | 2/1997 | Searle et al. | 455/562 |
| 5,615,409 | 3/1997 | Forssen | 455/562 |
| 5,657,487 | 8/1997 | Doner | 455/456 |

Primary Examiner—Edward F. Urban
Attorney, Agent, or Firm—Renner, Otto, Boisselle & Sklar, P.L.L.

[57] ABSTRACT

A network cellular communication system with power based locator system in which the location of a mobile communication unit within the network can be determined approximately. In particular, the power based locator system includes a pre-stored map of locations of a plurality of base stations within the network and the respective network cell coverage areas for those base stations. Each of the plurality of base stations is able to change the size of its respective cell by varying transmitter and receiver power levels. By incrementally changing its respective cell coverage area, the base station can effectively narrow down the region in which a mobile communication unit is located. The region information is correlated with the pre-stored map of locations to determine approximately where in the cellular communication network the mobile communication unit is located.

12 Claims, 8 Drawing Sheets

| BASE STATION DEVICE ID | CELL AREA | MOBILE TERMINAL DEVICE ID | MOBILE TERMINAL LOCATION |
|---|---|---|---|
| 0001 | A1, A2, A3 | 0001M | B3, B2, G3, G2, G1, H3, H2, H1 |
| 0002 | B1, B2, B3 | 0002M | A1, D3 |
| 0003 | C1, C2, C3 | 0003M | C3, C2, C1 |
| 0004 | D1, D2, D3 | 0004M | C3, E3, E2, E1 |
| 0005 | E1, E2, E3 | 0005M | |
| 0006 | F1, F2, F3 | 0006M | A3, A2, A1, D3 |
| 0007 | G1, G2, G3, H1, H2, H3 | 0007M | A3, B3, C3, F3 |
| ⋮ | ⋮ | ⋮ | ⋮ |

Fig. 8

WIRELESS COMMUNICATION SYSTEM HAVING BASE STATION WITH ADJUSTABLE POWER TRANSCEIVER FOR LOCATING MOBILE DEVICES

TECHNICAL FIELD

The present invention relates generally to wireless communication systems, and more particularly to a cellular communication system which can determine approximately the location of mobile communication units within a cellular communication network.

BACKGROUND OF THE INVENTION

In recent years, the use of cellular communication systems having mobile communication units which communicate with a hardwired network, such as a local area network (LAN) and a wide area network (WAN), has become widespread. Retail stores and warehouse, for example, may use cellular communications systems to track inventory and replenish stock. The transportation industry may use such systems at large outdoor storage facilities to keep an accurate account of incoming and outgoing shipments. In manufacturing facilities, such systems are useful for tracking parts, completed products and defects.

A typical cellular communication system includes a number of fixed base stations or access points interconnected by a system backbone. Such cellular communication systems which have a system backbone may also be hereinafter referred to as a network communication system. Also included in many cellular communication systems are intermediate base stations which are not directly connected to the system backbone. Intermediate base stations, often referred to as wireless base stations or repeaters, increase the area within which base stations connected to the system backbone can communicate with mobile communication units.

A cellular communication system includes several base stations, each of which transmits and receives RF signals throughout a predetermined coverage area referred to as a cell. A cell is a geographic area in which a base station has sufficient signal strength to transmit and receive data from a mobile communication unit or other device with an acceptable error rate. Thus, the outer boundary of a cell is determined not only by the radiated power of the base station transceiver (which determines the maximum range at which a mobile communication unit is able to receive a signal), but also by the effective radiated power of the mobile communication units (which determines the maximum range at which the base station is able to receive a signal). Typically, base stations will be positioned along the backbone such that the combined cell area coverage from each base station provides full coverage of a building or site. Further, it is also typical to have the cell area of coverage from two or more base stations to overlap or be colocated.

The shape of each cell is primarily determined by the type of antenna associated with a given base station. For instance, base stations which communicate with mobile communication units often have omnidirectional type antennas which provide for generally circular shaped cells and allow for a wide area of coverage. In many instances, however, the cell of a base station is not completely symmetrical because physical structures within the cell may partially block signals emanating from the base station or create "dead spots" where no signal can pass. Further, the cell size may be decreased by machinery located in the vicinity of the base station which generates excessive noise levels that degrade a signal transmitted by the base station.

Generally, when a mobile communication unit is powered up, it "registers" with a base station through which the mobile communication unit can maintain wireless communication with the network. In order to register, the mobile communication unit must be within the cell range of the base station and the base station must likewise be situated within the effective cell range of the mobile communication unit. It is generally not possible to have one base station service a large area by itself. This is due to transmission power restrictions governed by the FCC and the fact that such a large cell range would add significantly to the size and weight of the mobile communication unit thereby making it less desirable to use. Thus, cellular communication systems generally have several base stations spaced apart such that the collective cell area coverage of the base stations is sufficient to cover the entire area in which the mobile communication unit may roam. As the location of the mobile communication unit changes, the base station with which the mobile communication unit was originally registered may fall outside of the geographic cell range of the mobile communication unit. Therefore, the mobile communication unit may "deregister" with the base station it was originally registered to and register with another base station which is within its current communication range.

The mobility of the mobile communication unit in the aforementioned systems creates the need to determine the respective location of the mobile communication units within the network. Systems for locating mobile communication units are known, however, most of these systems employ global position system (GPS) technology. The Global Positioning System (GPS) is a network of approximately 24 satellites and a dozen ground stations. The GPS network currently provides navigation information worldwide. A receiver derives its three-dimensional position from ranging signals received from three or more satellites. However, GPS technology requires the use of expensive equipment and is generally not practicable for use in most local area network (LAN) based systems.

U.S. Pat. No. 5,519,760 ('760) to Borkowski et al. discloses a cellular position locating system which does not requires the use of GPS technology. However, the '760 patent only teaches a method for locating mobile devices in a cellular telephone network having a mobile switching center which provides necessary processing and switching to allow cellular phones to communicate with each other. This, of course, would have no benefit for locating mobile devices in a LAN, WAN or other cellular based system which does not have such a mobile switching center. Furthermore, the location information obtained in the system of the '760 patent only pertains to which of several cell sites a mobile unit is currently located. As cell site coverage areas are often very large, such information would not be sufficient for quickly and efficiently locating a mobile device.

In view of the aforementioned shortcomings associated with conventional communication systems involving locating mobile devices, there is a strong need in the art for a system and method for locating a mobile device in a cellular communication system wherein existing network components can be used to accurately narrow down and/or pinpoint the location of a mobile communication unit within the system.

SUMMARY OF THE INVENTION

The present invention provides a power based locator system. In accordance with the invention, an approximate location of a mobile communication unit within a cellular communication network is determined. In particular, the present invention includes a pre-stored map of locations of a plurality of base stations within the network and the respective network cell coverage areas for those base stations. Each of the plurality of base stations is able to change the size and/or shape of its respective cell by varying transmitter and receiver power levels and/or antennas. By incrementally changing its respective cell coverage area, the base station can effectively narrow down the region in which a mobile communication unit is located. The region information is correlated with the pre-stored map of locations to determine approximately where in the cellular communication network the mobile communication unit is located.

In accordance with a preferred embodiment of the present invention, a cellular communication system is provided, including: at least one base station having a communication cell coverage area, the at least one base station being coupled to a system backbone, the at least one base station including a receiving system for receiving wireless communications and a transmitting system for transmitting wireless communications, the at least one base station including a first antenna; and at least one mobile communication unit for communicating with the system backbone via the at least one base station, the at least one mobile communication unit having a mobile communication unit transmitter for transmitting wireless communications to the at least one base station and a mobile communication unit receiver system for receiving wireless communications from the at least one base station; wherein, the at least one base station can vary its cell coverage area so that the system can determine approximately where the at least one mobile communication unit is located.

In accordance with another embodiment of the invention, a base station to be used in determining the location of a mobile communication unit in a cellular communication system is provided, the base station including: a transmitter for transmitting a signal; a receiver for receiving a signal;

at least one amplifier for changing the gain of at least one of the transmitter and receiver; and a processor for controlling the transmitter and receiver, wherein the processor employs the at least one amplifier to change the gain of at least one of the transmitter and receiver in order to change a cell coverage area of the base station such that an approximate location of the mobile terminal can be determined.

According to still yet another embodiment of the invention, a method of locating a mobile communication unit within a network cellular communication system is provided, the method including the steps of: using a host computer to initiate a mobile communication unit location request to at least one base station; using the at least one base station to monitor for the mobile communication unit, wherein the base station upon locating the mobile communication unit varies its cell coverage area in order to determine approximately the location of the mobile communication unit with respect to the at least one base station; using the at least one base station to send the mobile communication unit location information to the host computer; and using the host computer to process the mobile communication unit location information received from the at least one base station in order to determine the location of the mobile communication unit with respect to the network.

According to a further embodiment of the invention, a cellular communication system is provided, including: at least one base station having a communication cell coverage area, the at least one base station being coupled to a system backbone, the at least one base station including a receiving system for receiving wireless communications and a transmitting system for transmitting wireless communications, the at least one base station including a first antenna; at least one mobile communication unit for communicating with the system backbone via the at least one base station, the at least one mobile communication unit having a mobile communication unit transmitter for transmitting wireless communications to the at least one base station and a mobile communication unit receiver system for receiving wireless communications from the at least one base station; wherein, the at least one base station can vary its cell coverage area so that the system can determine approximately where the at least one mobile communication unit is located with respect to the base station; and a host computer for receiving from the at least one base station the location information of the mobile communication unit with respect to the base station, wherein the host computer upon receiving the location information of the mobile communication unit with respect to the base station processes the information in conjunction with pre-stored map information to determine the location of the mobile communication unit within the network, the prestored map information including information relating to the location of the at least one base station within the network.

To the accomplishment of the foregoing and related ends, the invention then comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the drawings:

FIG. 8 is an illustration of a table of identification codes of respective base stations, the respective cell coverage area of the base stations, the identification codes of mobile communication units and the respective locations of the mobile communication units which is maintained by a processor according to the invention.

DESCRIPTION OF THE PREFERRED EMBODIMENTS

Figure 1:
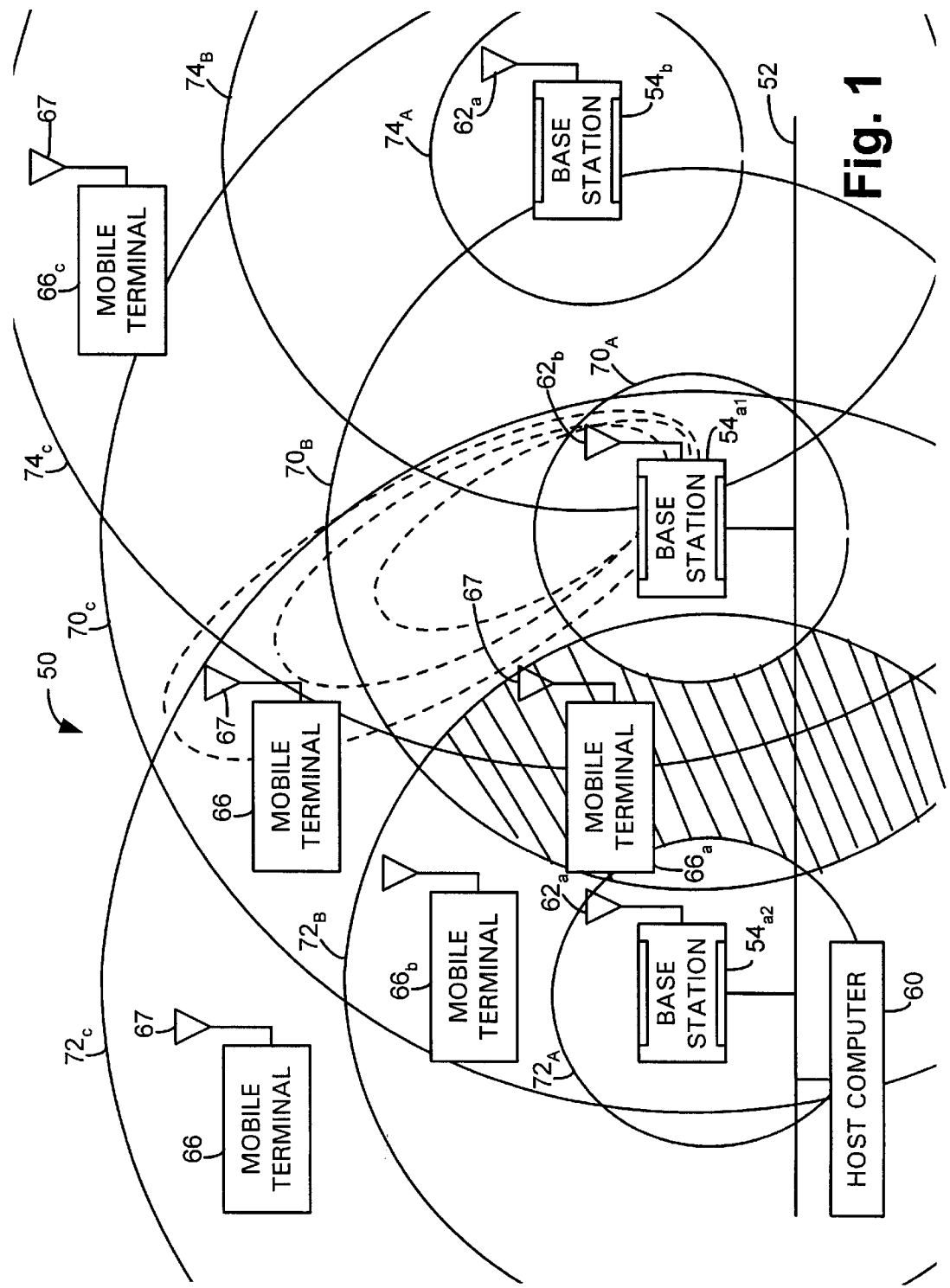
FIG. 1 is a system diagram of a network communication system in accordance with the present invention.

The present invention will now be described with reference to the drawings wherein like reference numerals are used to refer to like elements throughout. As mentioned above, the present invention relates to cellular communication systems which include mobile communication units that can roam from cell to cell. Such mobile communication units can be data terminals, telephones, pagers, automobiles, etc. In the exemplary embodiment described hereinafter, the mobile communication unit is a mobile data terminal used to communicate data such as inventory or the like. Accordingly, the terms "mobile communication unit" and "mobile terminal" are used interchangeably throughout the specification and claims. However, it is recognized that the invention contemplates other types of mobile devices and is not intended to be limited to systems using mobile data terminals.

Referring now to FIG. 1, a cellular communication system 50 is shown in accordance with the exemplary embodiment of the present invention. The cellular communication system 50 includes a network backbone 52. The network backbone 52 may be a hardwired data communication path made of twisted pair cable, shielded coaxial cable or fiber optic cable, for example, or may be wireless or partially wireless in nature. Coupled to the network backbone 52 are several base stations 54. Only two base stations $54_a$ are shown hardwired to the network backbone 52, however, it is understood that more than two hardwired base stations $54_a$ may be physically connected to the network backbone 52. The base stations 54 may be hardwired to the network backbone 52 such as base stations $54_a$ or may wirelessly couple to the backbone 52 such as base station $54_b$. Each base station 54 serves as an entrance point through which wireless communications may occur with the network backbone 52. The wireless base station $54_b$ may be employed to expand the effective communication range of the cellular communication system 50 and/or be used to provide more accurate location information in accordance with the present invention. As is conventional, each wireless base station $54_b$ associates itself, typically by registration, with another base station or a host computer 60 coupled to the network backbone 52, whether hardwired or wireless, such that a link is formed between itself and other devices situated on the network backbone 52.

Each base station 54 is capable of wirelessly communicating with other devices in the communication system 50 via respective antennas commonly denoted by reference numeral 62. The antenna 62 for any particular device may be of any type suitable for use in a network cellular communication system, such as an omni-directional antenna ($62_a$), a yagi-type antenna ($62_b$), etc. A geographic cell with each base station 54 defines a region of coverage in which successful wireless communications may occur. Depending on the type of antenna 62 selected and output power of the respective base station 54, the geographic cell may take one of several different forms and sizes. For example, the antenna 62 could be an omni-directional antenna if a generally spherical cell area of coverage is desired. A directed yagi-type antenna could be used as the antenna 62 for a more directed elliptical cell area of coverage.

The cellular communication system 50 also includes one or more mobile communication units 66. The mobile communication units 66 each include an antenna 67 for wirelessly communicating with other devices. Each mobile communication unit 66 communicates with devices on the network backbone 52 via a selected base station 54 and/or with other mobile communication units. Further, in the event the host computer 60 is capable of directly transmitting and receiving wireless communication, the mobile communication unit 66 may communicate directly with the host computer 60. Upon roaming from one cell to another, the mobile communication unit 66 is configured to associate itself with a new base station 54 if within range.

In searching for a mobile communication unit 66 according to the present invention, the host computer 60 initially broadcasts a request for a particular mobile communication unit (e.g., mobile communication unit $66_a$). The host computer 60 includes a pre-stored map of the geographical layout of the cellular communication network. The map includes the locations of the base stations 54 and the cell coverage areas of each respective base station 54. Since each base station 54 can change its effective cell coverage area, the map also includes the cell coverage area of each different sized cell associated with a particular base station 54. For instance, still referring to FIG. 1, base station $54_{a1}$ has respective cell coverage areas $70_A$, $70_B$ and $70_C$. Base station $54_{a2}$ has respective cell coverage areas $72_A$, $72_B$ and $72_C$. The map, has stored therein the location of base station $54_{a1}$ and the cell coverage area of its respective cells $70_A$, $70_B$ and $70_C$. Although only three different cell sizes are illustrated for a particular base station 54, it is understood that the base stations 54 can vary their respective cells any suitable number of times and sizes and the map can store the respective coverage areas of each of those cell sizes.

Once the host computer 60 initiates a search for a particular mobile communication unit (e.g., mobile communication unit $66_a$), all of the base stations 54 within the network begin monitoring for that particular mobile communication unit $66_a$. Once one or more base stations 54 locate the mobile communication unit $66_a$ being searched for, the base stations 54 change their cell sizes to further narrow the location of the mobile communication unit $66_a$. For example, if the mobile communication unit $66_a$ is within the respective cells $70_C$, $72_C$ of base stations $54_{a1}$, $54_{a2}$, these base stations $54_{a1}$, $54_{a2}$ then will decrease their cell coverage areas to respectively $70_B$ and $72_B$. Since the mobile communication unit $66_a$ is still in communication with each base station $54_{a1}$, $54_{a2}$, each base station $54_{a1}$, $54_{a2}$ changes its cell coverage area to $70_A$ and $72_A$, respectively. At this point, the mobile communication unit $66_a$ is not able to communicate with either base station $54_{a1}$, $54_{a2}$. Thus, each base station $54_{a1}$, $54_{a2}$ knows that the mobile communication unit is at least within the cell area defined by $70_B$ and $72_B$, respectively, but not closer than the cell areas defined by $70_A$ and $72_A$, respectively. Each base station $54_{a1}$, $54_{a2}$ acts autonomously of the other, and sends its respective information to the host computer 60. Thus, base station $54_{a1}$ will inform the host computer 60 that mobile communication unit $66_a$ is within cell coverage area $70_B$ but not $70_A$. Likewise, base station $54_{a2}$ will inform the host computer 60 that mobile communication unit $66_a$ is within cell coverage area $72_B$ but not $72_A$. After the host computer 60 receives all information from the base stations 54 relating to the location of mobile communication unit $66_a$, the host computer makes a determination via the map where the mobile communication unit $66_a$ is located. In this instance, since it is known that the mobile communication unit $66_a$ is located within cell areas $70_B$ and $72_B$ the mobile communication unit $66_a$ must be located in the region where these two cells overlap—this region is shown by crosshatching in FIG. 1.

In another example, the host computer is now searching for mobile communication unit $66_B$. The host computer initiates a location request to all base stations 54 within the network for the location of mobile communication unit $66_B$. In response, the base stations 54 begin to monitor for mobile communication unit $66_B$. Base stations $54_{a1}$, $54_{a2}$ both have found mobile communication unit $66_B$ within their respective cells $70_C$ and $72_C$. Next, both base stations decrease the size of their respective cell area coverage to $70_B$ and $72_B$.

In this example, base station $54_{a1}$ cannot communicate with mobile communication unit $66_B$ within the cell range defined by $70_B$, however, base station $54_{a2}$ is still able to communicate with mobile communication unit $66_B$. Base station $54_{a1}$ informs the host computer 60 that mobile communication unit $66_B$ is within the range defined by cell $70_C$, but not within the range defined by cell $70_B$. Base station $54_{a2}$ continues to decrease its cell coverage area to cell $72_A$. Base station $54_{a2}$ is not able to communicate with mobile communication unit $66_B$ within this cell range. Accordingly, base station $54_{a2}$ knows that mobile communication unit $66_B$ is within the range defined by cell $72_B$, but not within the range defined by cell $72_A$—this information is passed on to the host computer 60. Once all of the base stations 54 have sent the host computer 60 their respective location information relating to mobile communication unit $66_B$. The host computer processes the information and correlates the information with the pre-stored map to determine that the mobile communication unit $66_B$ is located within a region defined as an area bounded by the outer perimeter of cells $70_C$ and $70_B$, which overlaps with the area bounded by the outer perimeter of cells $72_B$ and $72_A$.

In yet another example, the host computer initiates a search for mobile communication unit $66_c$. In response, the base stations 54 begin to monitor for mobile communication unit $66_C$. Only base station $54_b$ has found mobile communication unit $66_C$. The base station $54_b$ knows that mobile communication unit $66_C$ is within the range of its respective cell $74_C$. Next, base station $54_b$ decreases the size of its respective cell area coverage to $74_B$. However, the base station $54_b$ cannot communicate with the mobile communication unit $66_C$ within this cell area. Thus, base station $54_b$ knows that mobile communication unit $66_C$ is within the range between cells $74_C$ and $74_B$, and this information is communicated to the host computer 60. Once all of the base stations 54 have sent the host computer 60 their respective location information relating to mobile communication unit $66_C$. The host computer processes the information and correlates the information with the pre-stored map to determine that the mobile communication unit $66_C$ is located within the region between cells $74_C$ and $74_B$, and is not within the range defined by cells $70_C$ and $72_C$. Therefore, it is understood that the host computer 60 also uses information from the base stations 54 that the mobile communication unit $66_C$ is not within their respective areas in determining the location of the mobile communication unit $66_C$. Although base station $54_b$ is a wireless base station, its respective location is fixed, which the host computer 60 utilizes in determining the location of the mobile communication unit $66_c$.

Figure 2:
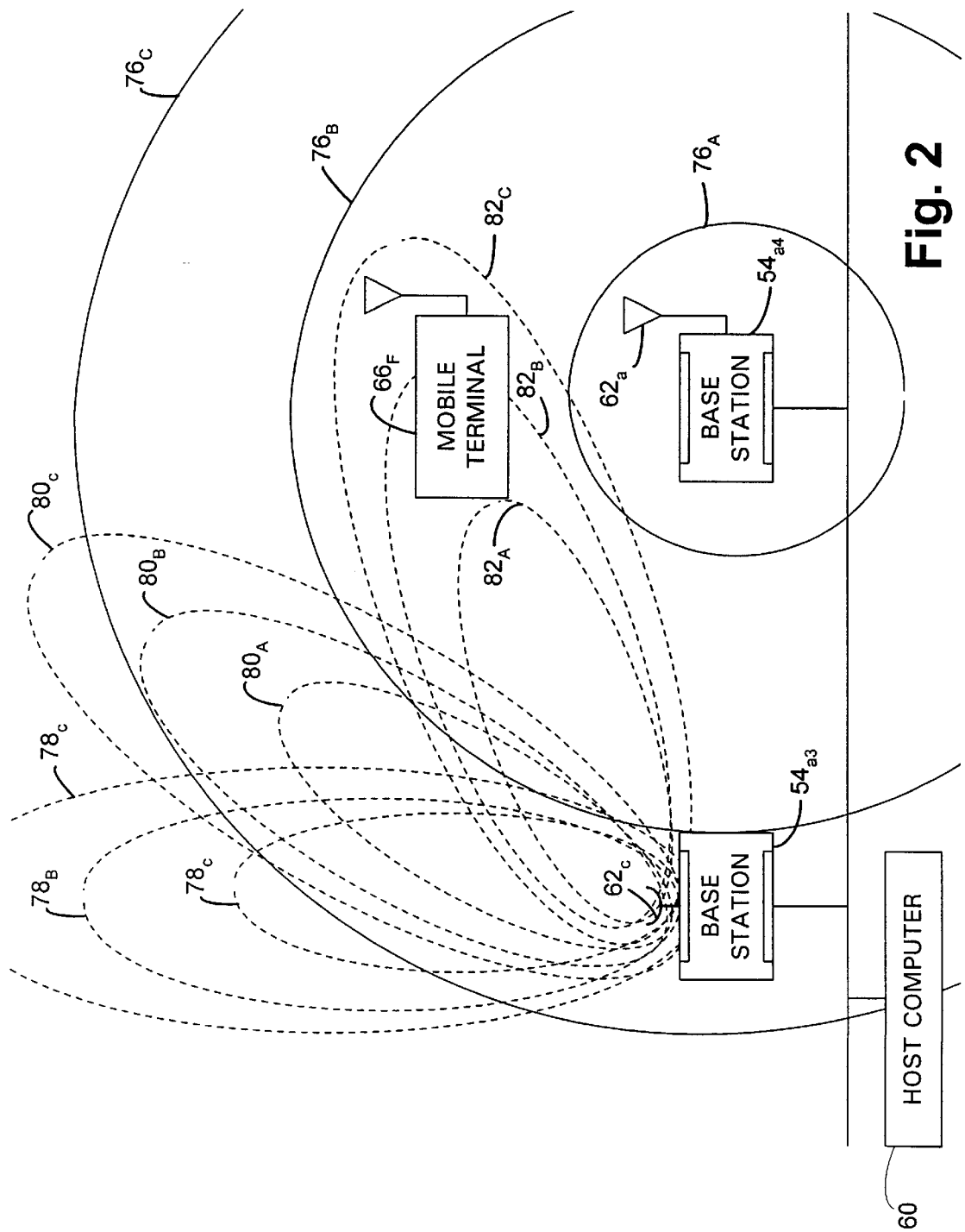
FIG. 2 is a system diagram of a network communication system which includes a base station having a directional antenna which can change the direction of a signal in accordance with the present invention.

FIG. 2 illustrates another embodiment of the present invention wherein a base station $54_{a3}$ employs a directional antenna (e.g., yagi-type antenna) $62_c$ which can change the respective direction of the signal (i.e., cell). The direction of the signal can be changed in a variety of ways such as, for example, rotating the antenna $62_c$, using beam forming techniques, etc. It is understood that any suitable method or device for changing the direction of the signal falls within the scope of this invention.

By selectively changing the direction of the signal, the present invention expands the range of coverage of the base station as well as affording for even more accurately determining the location of a mobile communication unit 66. For example, the host computer 60 now initiates a location request for mobile communication unit $66_F$. In response, the base stations 54 begin to monitor for mobile communication unit $66_F$. In this example, base station $54_{a4}$ has found mobile communication unit $66_F$ within its cell $76_C$. Base station $54_{a3}$ which has a directional antenna did not find the mobile communication unit $66_F$ within cells $78_c$ or $80_c$, but it did find the mobile communication unit $66_F$ within cell $82_c$. Next, both base stations decrease the size of their respective cell area coverage to $76_B$ and $82_B$. In this particular example, the base station $54_{a3}$ rotationally sweeps the directional coverage of antenna $62_c$ in 360° cycles and attempts communicating with mobile communication unit $66_F$ at the largest cell size ($78_c$, $80_c$, $82_c$). However, once the mobile communication unit $66_F$ is located, the base station $54_{a3}$ stops its sweeping of antenna $62_C$ and instead begins varying the cell coverage size as just described.

In this example, base station $54_{a3}$ cannot communicate with mobile communication unit $66_F$ within the cell range defined by $82_B$, however, base station $54_{a4}$ is still able to communicate with mobile communication unit $66_F$. Base station $54_{a3}$ informs the host computer 60 that mobile communication unit $66_B$ is within the range defined by cell $82_C$, but not within the range defined by cell $82_B$. Base station $54_{a4}$ continues to decrease its cell coverage area to cell $76_A$. Base station $54_{a4}$ is not able to communicate with mobile communication unit $66_F$ within this cell range. Accordingly, base station $54_{a4}$ knows that mobile communication unit $66_F$ is within the range defined by cell $76_B$, but not within the range defined by cell $76_A$—this information is passed on to the host computer 60. Once all of the base stations 54 have sent the host computer 60 their respective location information relating to mobile communication unit $66_F$. The host computer 60 processes the information and correlates the information with the pre-stored map to determine that the mobile communication unit $66_F$ is located within the region between cells $82_C$ and $82_B$, which overlaps with the region between cells $76_B$ and $76_A$. The region where the mobile communication unit $66_F$ is located is shown cross-hatched in FIG. 2.

As is apparent from this example, the directional antenna $62_C$ affords for more accurately determining the location of the mobile communication unit 66 since its cell coverage area is more directive. Additionally, coupling the directional antenna $62_c$ with an omni-directional antenna $62_a$ affords for even more accuracy with respect to determining the location of a mobile communication unit 66. It is understood that both types of these antennas could be located on a single base station 54. Additionally, it is understood that a plurality of directional antennas $62_c$ and a plurality of omnidirectional antennas $62_a$ can be used to locate a mobile communication unit 66.

Figure 3A:
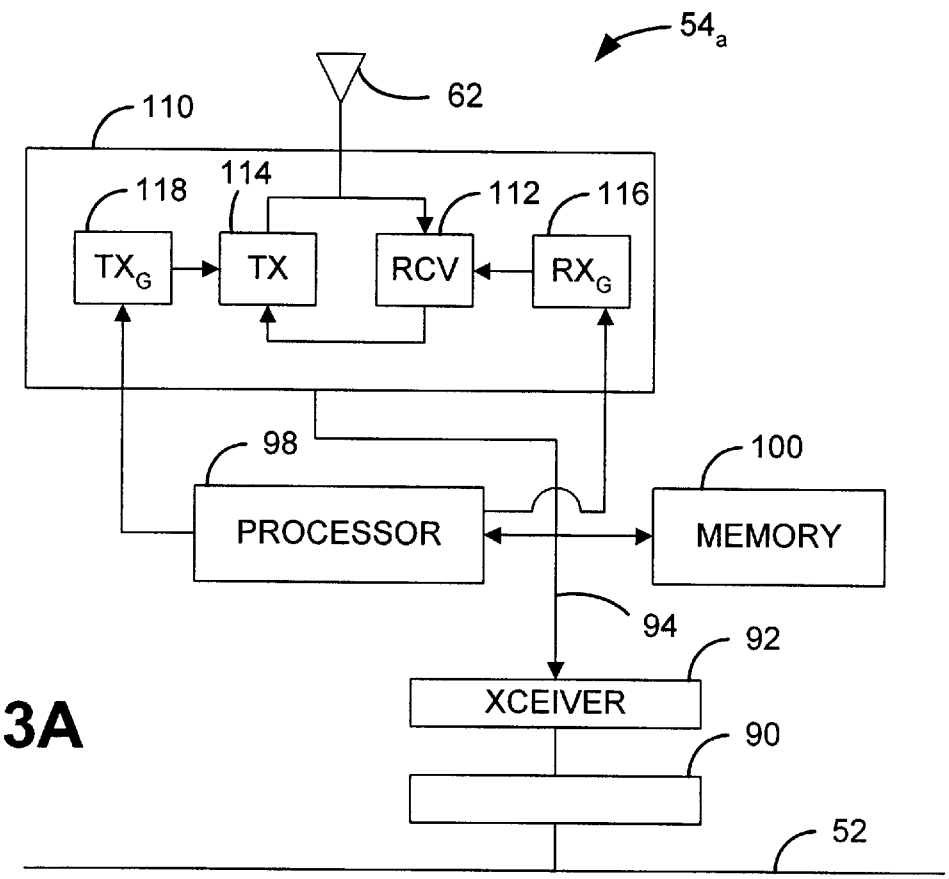
FIG. 3A is a block diagram of a hard wired base station in accordance with the present invention.

FIG. 3A is a block diagram representative of each hardwired base station $54_a$. Each hardwired base station $54_a$ is connected to the network backbone 52 via a connector 90 such as a DB-9 or RJ-45 connector. The connector 90 is connected to the network backbone 52 at one end and to a network adapter transceiver 92 included in the base station $54_a$ at the other end. The network adapter transceiver 92 is configured according to conventional adapter transceiver techniques to allow the base station $54_a$ to communicate over the network backbone 52. The network adapter transceiver 92 is also connected to an internal bus 94 included within the base station $54_a$. The base station $54_a$ further includes a processor 98 connected to the bus 94 for controlling and carrying out the operations of the base station $54_a$. The processor 98 may include any of a variety of different microprocessors, such as the Motorola 68360 or Intel 80486 microprocessors. It is understood that any suitable processor capable of carrying out the herein described functions of the base stations $54_a$ may be used and falls within the scope of this invention.

The base station $54_a$ also includes a memory 100 connected to the bus 94. The memory 100 stores program code executed by the processor 98 for controlling the other elements within the base station $54_a$ to carry out the functions described herein. It will be readily apparent to a person having ordinary skill in the art of microprocessor programming how to program the processor 98 to carry out the operations described herein using conventional programming techniques based on the flowcharts and descriptions provided herein. Accordingly, additional detail as to the specific program code has been omitted. The memory 100 also serves to buffer packets of information such as those received over the network backbone 52 or those transmitted to or received from the mobile communication units 66 or wireless base stations $54_b$. Furthermore, the memory 100 may store tables relating to the various cell sizes of the respective base station, the location of the mobile communication units 66 with respect to the cell areas, and the identification codes of the mobile communication units 66.

Also connected to the bus 94 is a radio frequency (RF) section 110 included in the base station $54_a$. The RF section 110 includes the aforementioned antenna 62 for receiving radio signals from and transmitting radio signals to mobile communication units 66 and wireless base stations $54_b$ (FIG. 3B) within the cell area of the base station $54_a$. Information transmitted from a mobile communication unit 66 or a wireless base station $54_b$ is received via the antenna 62 and is processed by an RF receiver 112 which is connected to the bus 94 and demodulates and decodes the signal and converts the signal to a digital signal having a packet format as discussed below in connection with FIG. 5. The processor 98 controls an RF transmitter 114 included in the RF section 110, the RF transmitter also being connected to the bus 94. The processor 98 causes the RF transmitter 114 to modulate and transmit an RF signal which in turn carries the information packet (FIG. 5) to the appropriate mobile communication unit 66 or wireless base station $54_b$. Also included in the RF section is a receiver gain amplifier 116 which is coupled to the receiver 112 and the processor 98. The processor 98 employs the receiver gain amplifier 116 to vary the cell size of the base station $54_a$ with respect to the receiving aspect of the cell range. The RF section 110 further includes a transmitter gain amplifier 118 which is coupled to the transmitter 114 and the processor 98. The processor 98 employs the receiver gain amplifier 118 to vary the cell size of the base station $54_a$ with respect to the transmitting aspect of the cell range.

The processor 98 in the base station $54_a$ inserts source routing information into the source routing field of the packet that is received from the mobile communication unit 66, if needed. Thereafter, the processor 98 stores the packet in the memory 100 until such time as the base station $54_a$ is able to transmit the information packet onto the network backbone 52 via the network adapter transceiver 92 and connector 90.

Figure 3B:
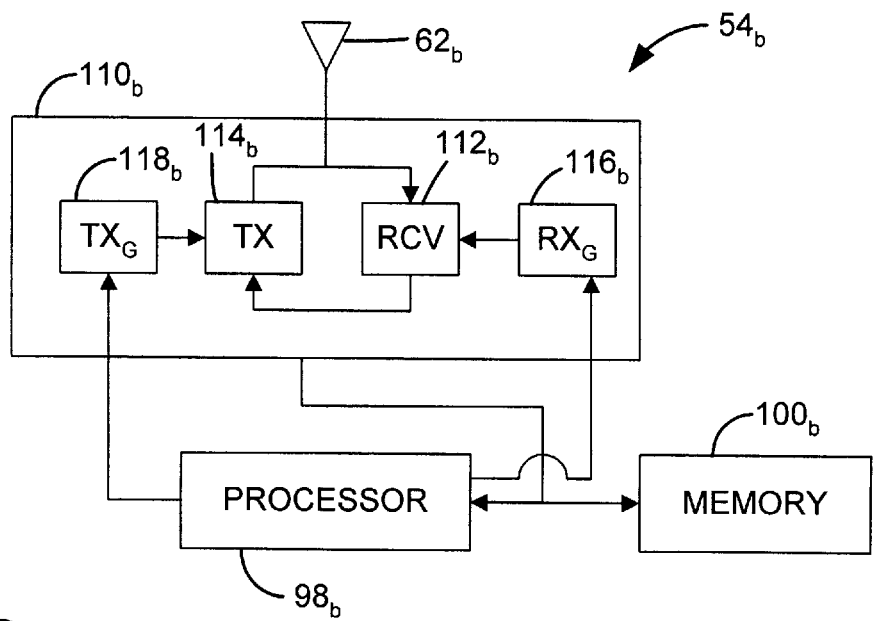
FIG. 3B is a block diagram of a wireless base station in accordance with the present invention.

FIG. 3B is a block diagram representative of each wireless base station $54_b$ in the system 50. For the most part, the construction and operation of the components within the wireless base station $54_b$ are identical to those described with respect to the base stations $54_a$. Hence, similar components are denoted simply by the addition of a [b]. For example, the processor 98 in the base station $54_a$ is equivalent to the processor 98 in the wireless base station $54_b$. However, the wireless base station $54_b$ is not connected directly to the network backbone 52 and therefore does not include a network transceiver 92 or connector 90 as in each base station $54_a$. Rather, the wireless base station $54_b$ communicates with mobile communication units 66 registered thereto and with the particular base station with which the wireless base station $54_b$ is associated with via the RF section $110_b$. Operations of the two base stations $54_a$ and $54_b$ are primarily the same with the exception of the particular procedures described herein. As mentioned above, the wireless base stations $54_b$ function to extend the relative cell coverage of a given base station $54_a$, and serve primarily to relay information between the base stations $54_a$ connected to the network backbone 52 and the mobile communication units 66.

Figure 3C:
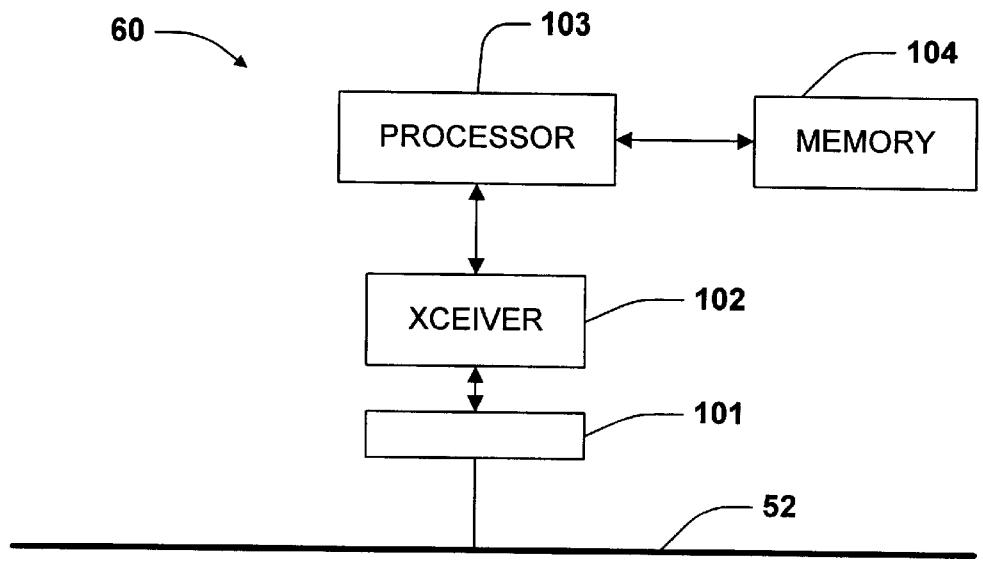
FIG. 3C is a block diagram of a host computer in accordance with the present invention.

FIG. 3C is a block diagram representative of the host computer 60 of the present invention. Although operations performed by the host computer 60 are conventionally different than the operations of a base station 54, the hardware components are similar to those hardware components described with respect to base station $54_a$ in FIG. 3A. Hence, the function and interconnection among the hardware components will not be described again in detail. Rather, as shown in FIG. 3C, similar to base station $54_a$, the host computer includes a backbone connector 101, a transceiver 102, a processor 103 and a memory 104. Unlike the base stations 54, however, the host computer 60 of this particular embodiment does not include an RF section 110. Thus, in order for the host computer 60 to communicate with any mobile communication unit 66, the host computer 60 must route all such communication over the backbone 52 and through one of the base stations 54. Similarly, for a mobile communication unit 66 to communicate with the host computer 60, the mobile communication unit 66 must first access the network backbone 52 through one of the existing base stations 54 which will then ensure the communication is properly delivered to the host computer 60. The host computer serves as a central unit where large operational based and application based software programs are stored and executed in order to provide the necessary functions which the power based locator system 50 was designed to perform.

The memory 104 of the host computer 60 stores for example a map of the geographic location of the base stations 54 within the cellular communication network. The map also includes the coverage area of the various cells associated with each base station 54. Additionally, the memory stores the locations of the various mobile communication units within the network. As described above, the host computer 60 initiates a request for the location of a mobile communication unit 66. Then the base stations 54 monitor for the particular mobile communication unit 66 and send corresponding location information back to the host computer 66 which processes the information in conjunction with the map information to determine the location of the mobile communication unit 66. This newly obtained location information is stored in a table (See FIG. 10) in the memory 104.

Figure 4:
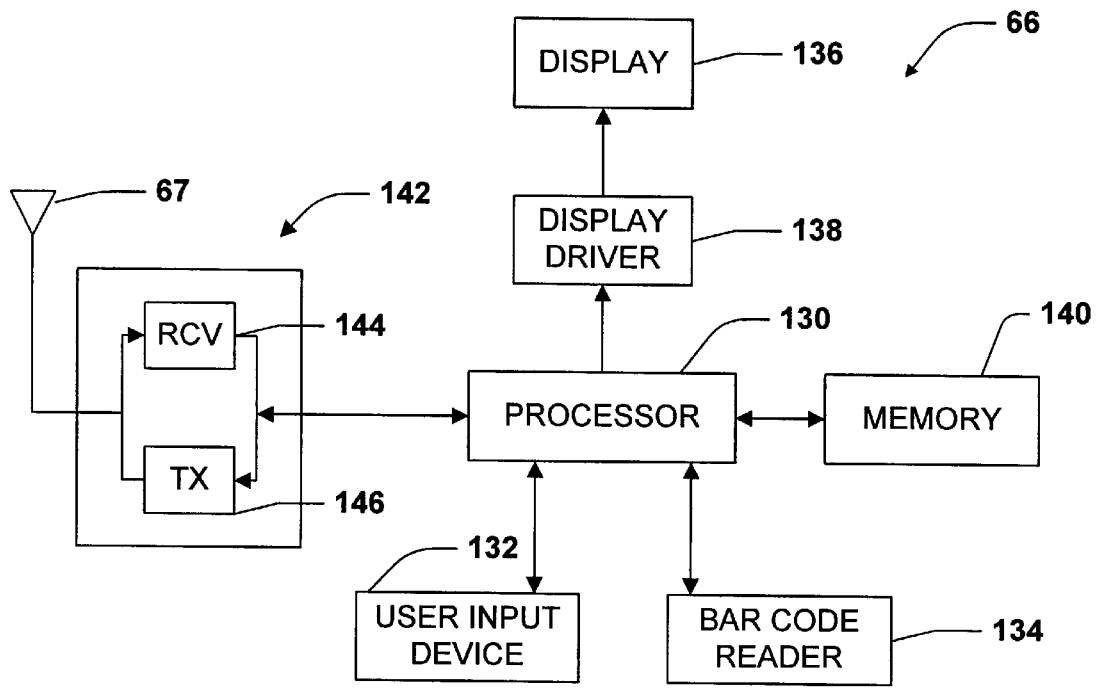
FIG. 4 is a block diagram of an exemplary mobile communication unit in accordance with the present invention.

FIG. 4 is a block diagram representing the basic structure of each mobile communication unit 66 according to the exemplary embodiment. Each mobile communication unit 66 includes a processor 130 which can be programmed to control and operate the various components within the mobile communication unit 66 in order to carry out the various functions described herein. The processor 130 has coupled thereto a user input device 132 which allows a user to input data to be communicated to the network backbone 52 such as inventory data, patient information, etc. This information may be sent to the host computer 60 which serves as a central data location, for example, or to a cash register connected to the network backbone 52, as another example, for providing price information. The input device 132 can include such items as a keypad, touch sensitive display, etc. The mobile communication unit 66 also may include a bar code scanner 134 coupled to the processor 130 serving as another form of data input. A display 136 is connected to and controlled by the processor 130 via a display driver circuit 138. The display 136 serves as a means for displaying information stored within the mobile communication unit 66 and/or received over the network backbone 52 via a base station 54. The display 136 can be a flat panel liquid crystal display with alphanumeric capabilities, for example, or any other type of display as will be appreciated.

A memory 140 is included in each mobile communication unit 66 for storing program code executed by the processor 130 for carrying out the functions described herein. The actual code for performing such functions could be easily programmed by a person having ordinary skill in the art of microprocessor programming in any of a number of conventional programming languages based on the disclosure herein. Consequently, further detail as to the particular code has been omitted for sake of brevity.

The memory 140 also serves as a storage medium for storing information packets received from or intended to be transmitted to a base station 54 as discussed herein. Furthermore, the memory 140 stores an identification code which is used to designate and distinguish the mobile communication unit 66 from the other mobile communication units 66 registered to the network backbone 52.

Each mobile communication unit 66 also includes its own RF section 142 connected to the processor 130. The RF section 142 includes an RF receiver which receives the RF transmissions from a base station 54 via an antenna 67 and demodulates the signal to obtain digital information modulated therein. The RF section 144 also includes an RF transmitter 146. In the event the mobile communication unit 66 is to transmit information to the network backbone 52 in response to an operator input at input device 132, for example, the processor 130 forms within the memory 140 an information packet including data together with a source address (i.e., the address of the particular mobile communication unit 66 sending the information) and a destination address (e.g., the host computer 60 or other network device). The information packet is then delivered to the RF transmitter 146 which transmits an RF signal with the information packet modulated thereon via the antenna 67 to the base station 54 with which the mobile communication unit 66 is registered. It should, of course, be understood that not all the components of the mobile communication unit 66 just described are necessary to practice the present invention (i.e., bar code scanner 134, display 136, etc.), but rather are only discussed to illustrate one specific embodiment.

Figure 5:
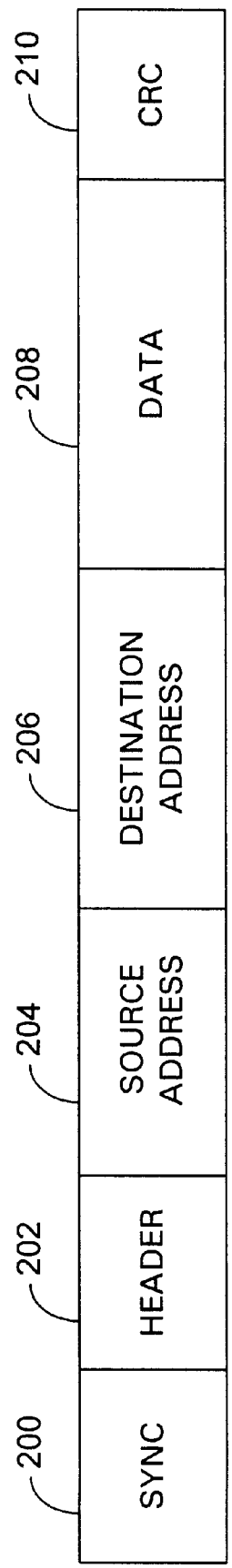
FIG. 5 is a schematic diagram representing an exemplary format for information packets which are communicated between devices in a network communication system in accordance with the present invention.

Referring briefly to FIG. 5, an exemplary format for packets sent between devices in the system 50 is shown. Each packet may include a number of fields such as a synchronization field 200, a header field 202, a source address field 204, a destination address field 206, a data field 208, and an error detecting field (CRC) 210, for example. The synchronization field 200 includes synchronizing bits which allow a device receiving the packet an opportunity to "sync" to the packet as is conventional. The header field 202 follows the synchronization field 200 and includes information such as the length and type of the packet. For example, the header field 202 may indicate whether the packet is a type which requires a response from the receiving device. The source address field 204 follows the header field and includes an address of the device from which the packet originated. Following the source address field 204, the packet includes a destination address field 206 which holds the address of the device to which the packet is ultimately destined. The data field 208 in the packet includes various information intended to be communicated to the receiving device. The packet ends with a cyclical redundancy code (CRC) field 210 which serves as an error detecting field according to the conventional techniques such that a receiving device can determine if it has properly received the packet.

Figure 6:
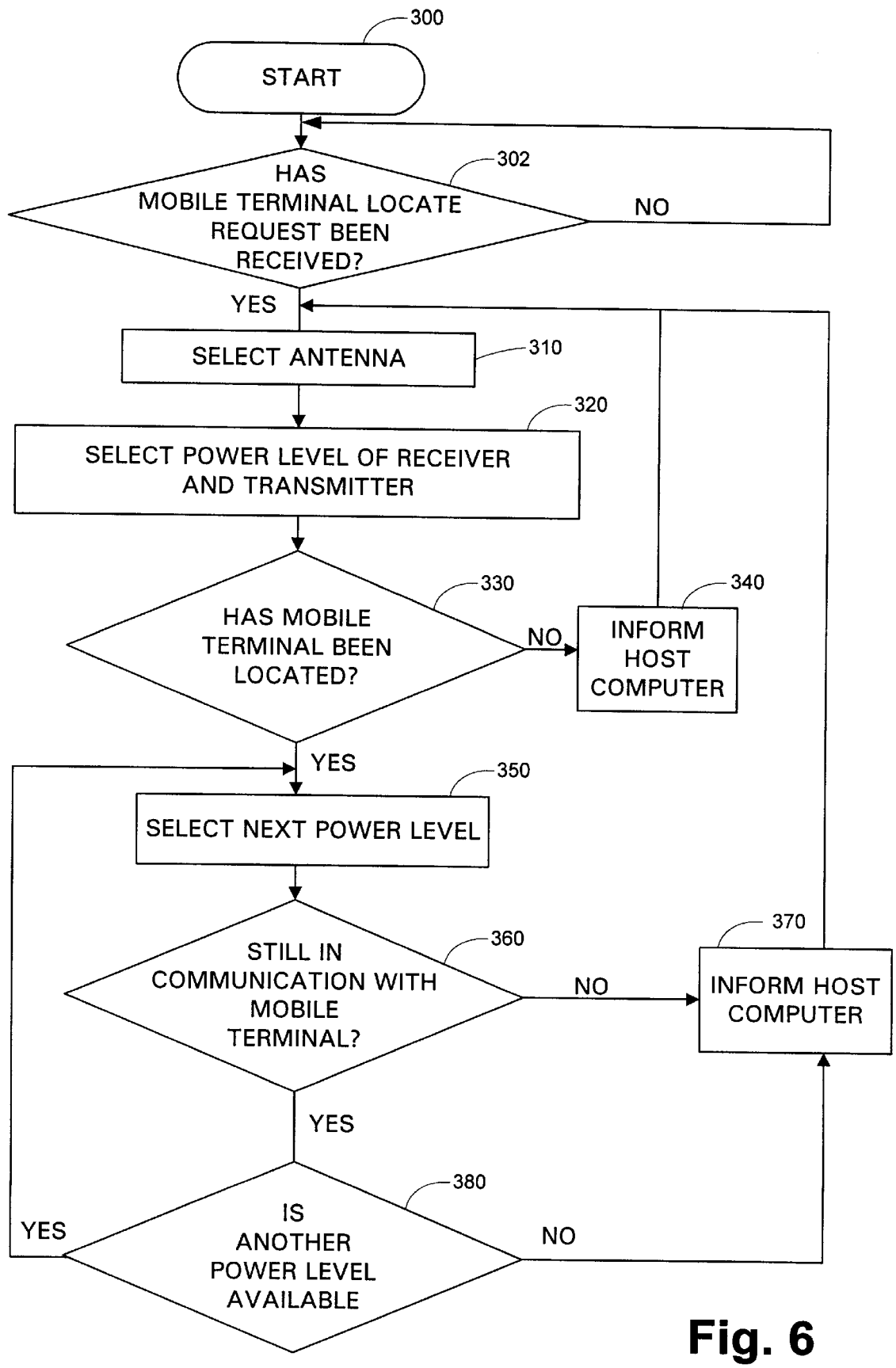
FIG. 6 is a flowchart suitable for programming the operation of a base station in order to determine approximately the location of a mobile communication unit in accordance with the present invention.

Referring now to FIG. 6, the operation of the base station 54 which has received a mobile communication unit 66 location request in accordance with the present invention is illustrated. In step 300, the base station is initially started and goes through any self-initialization routines and the like that may be desired. Following step 300, the processor 98 (FIG. 3A) in the base station 54 proceeds to step 302 where it waits for a request from the host computer 60 to locate a mobile communication unit 66. If a request is not received, the processor repeats step 302. Once a mobile communication unit 66 location request has been received, the processor advances to step 310 where the processor selects an antenna 62. Next, in step 320, the processor 98 selects the power level of the receiver 112 and the transmitter 114 in order to define a particular cell coverage area. As discussed above, the processor 98 sets the power level of the receiver 112 and transmitter 114, respectively, via the receiver gain amplifier 116 and transmitter gain amplifier 118.

After the cell coverage area has been set, the processor 98 proceeds to step 330 and monitors for the mobile communication unit 66 to be located. If the processor 98 in step 330 has not located the mobile communication unit it proceeds to step 340. In step 340, the processor 98 informs the host computer 60 that the mobile communication unit 66 is not within communication range of the base station 54. If in step 330 the mobile communication unit 66 is located, the processor 98 advances to step 350 where it selects the next power level for the receiver 112 and the transmitter 114 in order to decrease the respective cell coverage area. Then in step 360, the processor determines if the base station 54 is still in communication with the mobile communication unit 66. If no, the processor 98, in step 370, informs the host computer 60 of the various cell coverage areas in which the mobile communication unit 66 was in communication with the base station 54. The processor 98 also informs the host computer 60 of the respective cell coverage areas in which the mobile communication unit 66 could not communicate with the base station 54. Then, the processor 98 returns to step 302 where it waits for another mobile communication unit 66 location request. If yes, the processor goes to step 380 where it determines if there are any other power levels at which the base station 54 can communicate. If no, the processor 98 goes to step 370 and informs the host computer of the last power level which was attempted. If in step 380 another power level is available, the processor 98 repeats step 350 where a next power level is selected. Although it has been shown in this specific embodiment that the cell sizes are varied by changing the power level, it is to be appreciated that any method of varying cell sizes can be employed including, for example, varying antenna gain levels and/or utilizing different antennas, etc.

Figure 7:
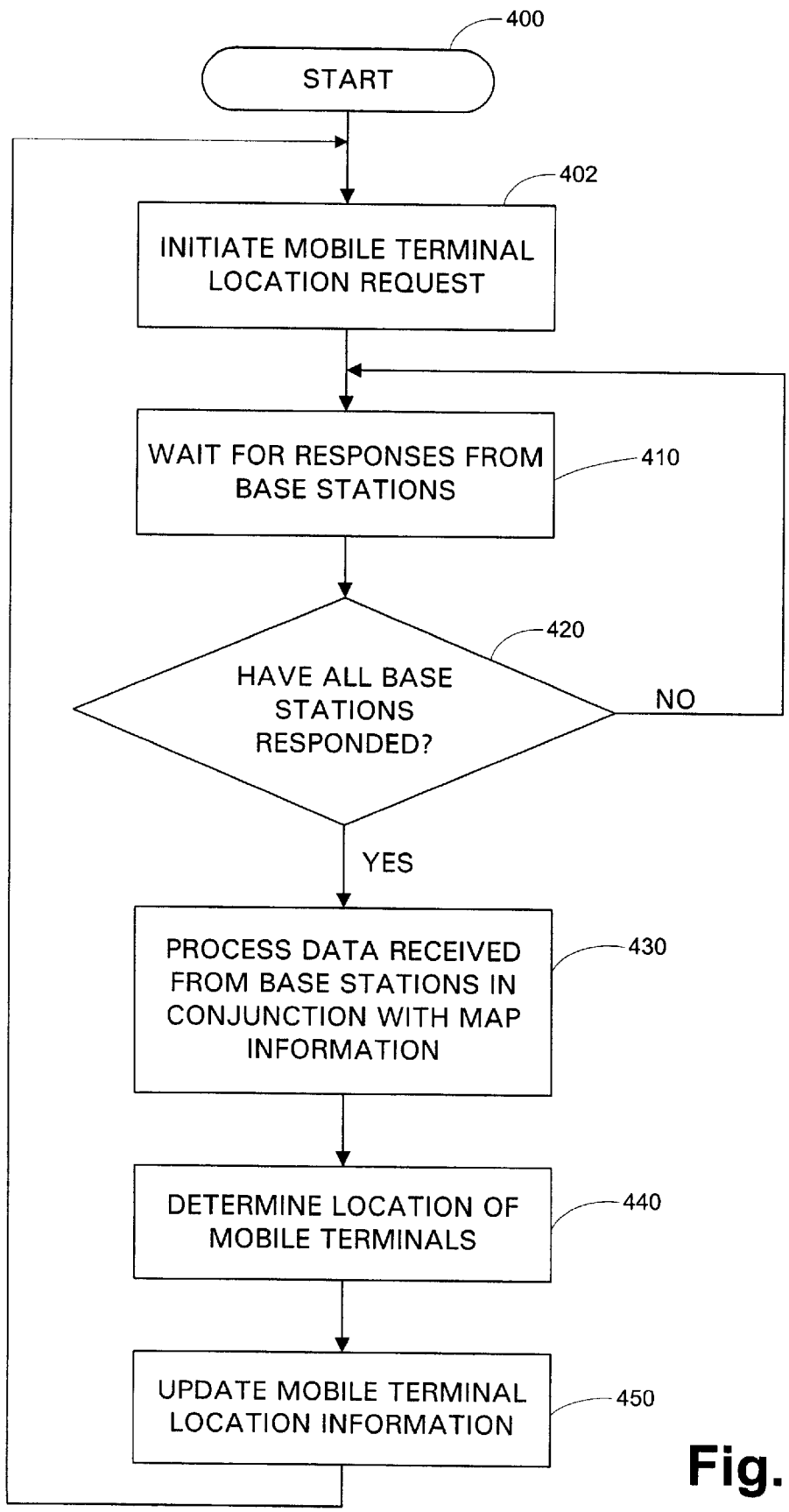
FIG. 7 is a flowchart suitable for programming the operation of a host computer to determine approximately the location of a mobile communication unit in accordance with the present invention.

FIG. 7 illustrates the operation of the host computer 60 determining the location of a mobile communication unit 66 in accordance with one embodiment of the present invention. In step 400, the host computer 60 is initially started and goes through any self-initialization routines and the like that may be desired. Following step 400, the processor 103 (FIG. 3C) in the host computer 60 proceeds to step 402 where it initiates a request to the base stations 54 in the cellular communication network for the location for the location of a mobile communication unit 66. Then, the processor 103 proceeds to step 410 where it waits for responses from all the base stations 54 in the network. In step 420, if the processor 103 determines that not all of the base stations 54 have responded, it returns to step 410 to wait for all of the base stations 54 to respond.

If in step 420, the processor determines that all of the base stations 54 have responded, it advances to step 430. In step 430, the processor 103 processes the data received from the base stations 54 in conjunction with the geographical map information relating to the location of the base stations and the coverage areas of their respective cell regions. Next, the processor moves to step 440 where it determines the location of the mobile communication unit 66. Then, in step 450, the processor 103 updates the location information of the mobile communication unit 103. The location information of the mobile communication unit 66 may be stored in a table as shown in FIG. 8. Next, the processor 103 returns to step 402 where it will initiate another mobile communication unit location request.

FIG. 8 depicts a mobile communication unit location table which is stored in the memory 104 of the host computer 60. In FIG. 8, the first column stores the identification codes of the base stations 54 in the cellular communication network. The next column stores the various geographical region information of the cell areas of the respective base station 54. The next column stores the identification codes of the mobile communication units 66 located within the cellular communication network. The next column stores the latest location information of the respective mobile communication unit 66. For example, mobile communication unit 0004M is located within the cell coverage areas defined by C3, E1, E2, E3. Thus, mobile communication unit 0004M must be within communicating range of base station 0003 and base station 0005. Since mobile communication unit 0004M is located within all the cell coverage areas E1–E3 of base station 0005, it must be within close proximity to base station 0005. The mobile communication unit 0004M is only within the largest cell coverage area of base station 0003 and not within its small cell coverage areas. Thus, the mobile communication unit 0004M must be located within the region where cell coverage areas El (the smallest cell coverage area of base station 0005) and C3 (the largest cell coverage area of base station 0003) overlap.

In another example, mobile communication unit 0005M has no location information associated therewith, which means that either the mobile communication unit 0005M is not within communication range of any base station 54, is not powered on or is of a type which makes it unable to communicate with the base stations 54, for example.

It is to be understood that the present invention will be able to determine the location of a mobile communication unit 66 even when it is in a power savings mode since the base stations 54 are still able to lock-on to a mobile communication unit 66 in such a mode. Additionally, the mobile communication units 66 do not have to register with the base stations 54 in order for the base stations 54 to determine if the mobile communication unit 66 is within its cell coverage area. The base stations 54 can monitor for the mobile communication units 66 simply by searching for announce packets which are transmitted by the mobile communication units 66.

In yet another example, base station 0007 includes two types of antennas. One antenna is an omni-directional type and the other is a directional type antenna. Cells G1–G3 correspond to cell regions of the omni-directional antenna and cells H1–H3 correspond to cell regions of the directional antenna. Mobile communication unit 0001M is located within the cell regions B3, B2, G3, H1, H2, H3. The cell regions B3, B2 correspond with base station 0002. Cell regions G3–G1 corresponds to the omnidirectional antenna of base station 0007. Cell regions H1–H3 correspond to the directional antenna of base station 0007. Thus, the mobile communication unit 0007 is located within the region where cell coverage areas B2, G1 and H1 overlap. The directional antenna of base station 0007 has afforded for a relatively precise determination of the location of mobile communication unit 0001M in this example.

It is to be appreciated that any suitable type of location table and table format may be used for the purposes of this invention, and fall within the scope of this invention. For example, the table may also include the plurality of cell areas covered by an antenna which can directionally rotate its cell coverage area.

Additionally, although the invention has been shown and described with respect to certain preferred embodiments, it is obvious that equivalents and modifications will occur to others skilled in the art upon reading and understanding the specification. For example, the present invention has been described with respect to the host computer 60 having pre-loaded map information relating to precise cell coverage areas for the base stations 54. However, it is to be understood that the scope of the present invention is not limited to the host computer 60 having pre-loaded map information relating to precise cell coverage areas for the base stations 54. It will be appreciated that if such map information is not available the host computer 60 can calculate such information base on known coverage areas for different types of antennas operating at different power levels.

Furthermore, it is to be understood that the base stations 54 need not be simply reactive to a mobile communication unit location request from the host computer 60. Rather, it will be appreciated that the base stations 54 can be programmed to update the host computer 60 with location information relating to the mobile communication unit 66.

Moreover, it is to be understood that the present invention is not limited to a two-dimensional network. The scope of the present invention is intended to include a three-dimensional network. For example, the present invention can be employed in building to determine the location of a mobile communication unit 66 on a different floor from the base station 54 and/or the host computer 60.

The present invention includes all such equivalents and modifications.

What is claimed is:

1. A method of locating a mobile communication unit within a network cellular communication system comprising the steps of:

using a host computer to initiate a mobile communication unit location request to at least one base station;

using the at least one base station to monitor for the mobile communication unit, the base station including circuitry for adjusting a power level of signals being communicated by the base station, wherein the base station upon locating the mobile communication unit varies the power level whereby a size of a cell coverage area of the base station is varied in order to determine approximately the location of the mobile communication unit with respect to the at least one base station;

using the at least one base station to send the mobile communication unit location information to the host computer; and using the host computer to process the mobile communication unit location information received from the at least one base station in order to determine the location of the mobile communication unit with respect to the network;

wherein the host computer correlates the information received from the at least one base station with a pre-stored map to determine the location of the mobile communication unit with respect to the network.

2. The method of claim 1 wherein the map includes the location of the at least one base station with respect to the network.

3. The method of claim 2 wherein the map includes the location information of a plurality of cell coverage areas of the at least one base station.

4. A cellular communication system, comprising:

at least one base station having a communication cell coverage area, the at least one base station being coupled to a system backbone, the at least one base station including a receiving system for receiving wireless communications and a transmitting system for transmitting wireless communications, the at least one base station including a first antenna and circuitry for adjusting the cell coverage area of signals being transmitted or received by the first antenna;

at least one mobile communication unit for communicating with the system backbone via the at least one base station, the at least one mobile communication unit having a mobile communication unit transmitter for transmitting wireless communications to the at least one base station and a mobile communication unit receiver system for receiving wireless communications from the at least one base station;

wherein, the at least one base station can vary its cell coverage area so that the system can determine approximately where the at least one mobile communication unit is located with respect to the base station; and a host computer for receiving from the at least one base station the location information of the mobile communication unit with respect to the base station, wherein the host computer upon receiving the location information of the mobile communication unit with respect to the base station processes the information in conjunction with pre-stored map information to determine the location of the mobile communication unit within the network, the pre-stored map information including information relating to the location of the at least one base station within the network.

5. The cellular communication system of claim 4 wherein the pre-stored map information further includes information relating to the location of a plurality of cell coverage areas of the at least one base station.

6. The cellular communication system of claim 4 wherein the cell coverage area is varied by changing the power level of the signal being transmitted by the first antenna.

7. The cellular communication system of claim 4 wherein the first antenna is a directional antenna.

8. The cellular communication system of claim 7 wherein the cell coverage area is varied by changing the respective direction of the signal being transmitted by the first antenna.

9. The cellular communication system of claim 8 wherein the respective direction of the signal is changed by selectively rotating the first antenna.

10. The cellular communication system of claim 8 wherein the first antenna is an omni-directional antenna.

11. The cellular communication system of claim 4 wherein the at least one base station has a second antenna.

12. The cellular communication system of claim 11 wherein the at least on base station employs both the first antenna and the second antenna to further determine the location of the at least one mobile communication unit.

* * * * *